(12) United States Patent
Zilberman et al.

(10) Patent No.: US 9,829,978 B2
(45) Date of Patent: Nov. 28, 2017

(54) INTERFACE LAYER AND OPERATING SYSTEM FACILITATING USE, INCLUDING BY BLIND AND VISUALLY-IMPAIRED USERS, OF TOUCH-SCREEN-CONTROLLED CONSUMER ELECTRONIC DEVICES

(75) Inventors: Boaz Zilberman, Ramat Hasharon (IL); Michael Vakulenko, Zichron Yaakov (IL); Arik Siegel, Tzur Moshe (IL); Ehud Nachum, Bney Brak (IL)

(73) Assignee: PROJECT RAY LTD., Yokneam (IL)

(*) Notice: Subject to any disclaimer, the term of this patent is extended or adjusted under 35 U.S.C. 154(b) by 82 days.

(21) Appl. No.: 14/238,609

(22) PCT Filed: Aug. 12, 2012

(86) PCT No.: PCT/IL2012/050304
§ 371 (c)(1),
(2), (4) Date: Feb. 12, 2014

(87) PCT Pub. No.: WO2013/024479
PCT Pub. Date: Feb. 21, 2013

(65) Prior Publication Data
US 2014/0215329 A1 Jul. 31, 2014

Related U.S. Application Data

(60) Provisional application No. 61/524,338, filed on Aug. 17, 2011.

(51) Int. Cl.
*G06F 3/048* (2013.01)
*G06F 3/01* (2006.01)
(Continued)

(52) U.S. Cl.
CPC ............ *G06F 3/016* (2013.01); *G06F 3/0482* (2013.01); *G06F 3/167* (2013.01)

(58) Field of Classification Search
CPC ....................................................... G06F 3/048
See application file for complete search history.

(56) References Cited

U.S. PATENT DOCUMENTS

| 5,287,102 A | 2/1994 | McKiel, Jr. |
| 2007/0080951 A1* | 4/2007 | Maruyama ............ G06F 1/1626 345/173 |

(Continued)

OTHER PUBLICATIONS

International Search Report for corresponding application PCT/IL2012/050304 filed Aug. 12, 2012; dated Dec. 4, 2012.

(Continued)

*Primary Examiner* — Xuyang Xia
(74) *Attorney, Agent, or Firm* — Cantor Colburn LLP

(57) ABSTRACT

A computerized system for facilitating eye-free use, e.g. by the blind, of an electronic device, the system comprising an interface layer including a hierarchy of operating modes presenting a portion of a hierarchy of possible choices, each portion comprising possible users' choices within the hierarchy; and an OS for accepting, via a touch screen, selected options generated by the user responsive to the sequence of possible choices respectively, and for activating electronic device functionalities accordingly. The hierarchy of possible choices includes sequences of n possible choices presented within sequences of n operating modes having n predetermined archetypical formats each having at least one fixed characteristic. The interface layer includes an orientation signal generator for generating orientation signals, sensible by the user and uniquely associated with the archetypical formats. Generation of each orientation signal coincides with presentation of its associated archetypical format, to orient the user within the hierarchy.

16 Claims, 12 Drawing Sheets

(51) Int. Cl.
*G06F 3/16* (2006.01)
*G06F 3/0482* (2013.01)

(56) References Cited

U.S. PATENT DOCUMENTS

| | | | |
|---|---|---|---|
| 2007/0146337 A1* | 6/2007 | Ording | G06F 3/0485 345/173 |
| 2007/0277107 A1* | 11/2007 | Almas | G06F 3/0482 715/727 |
| 2007/0291014 A1 | 12/2007 | Layton et al. | |
| 2007/0291018 A1* | 12/2007 | Park | G06F 3/03547 345/184 |
| 2008/0259053 A1 | 10/2008 | Newton | |
| 2009/0322695 A1* | 12/2009 | Cho | G06F 3/0416 345/173 |
| 2010/0073329 A1 | 3/2010 | Raman et al. | |
| 2010/0100849 A1* | 4/2010 | Fram | G06F 3/0236 715/835 |
| 2010/0283744 A1* | 11/2010 | Nordenhake | G06F 3/04883 345/173 |
| 2011/0113328 A1* | 5/2011 | Marzke | G06F 3/0488 715/702 |
| 2011/0210926 A1* | 9/2011 | Pasquero | G06F 3/016 345/173 |

OTHER PUBLICATIONS

Bonner et al. No-Look Notes: Accessible Eyes-Free Multi-Touch Text Entry. 2010. Proceedings of the 8th international conference on Pervasive Computing (Pervasive'10). [retrieved on Nov. 12, 2012]. Retrieved from the internet URL: http://www.cc.gatech.edu/-keith/pubs/perv2010-nolooknotes.pdf, pp. 409-426.

Kane et al. Slide Rule: Making Mobile Touch Screens Accessible to Blind People Using Multi-Touch Interaction Techniques. Oct. 2008. Proceedings of the 10th International ACM SIGACCESS conference on Computers and accessibility (Assets '08), Retrieved from the internet <URL:http:/ldoi.acm.org/10.1145/1414471.1414487> pp. 73-80.

Kane et al. Usable Gestures for Blind People: Understanding Preference and Performance. Proceedings of the SIGCHI Conference on Human Factors in Computing Systems {CHI'11). May 2011 . [retrieved on Nov. 12, 2012]. Retrieved from the internet URL: http:l/doi.acm.org/10.1145/1 978942.1979001 pp. 413-422.

Written opinion for corresponding application PCT/IL2012/050304 filed Aug. 12, 2012; dated Dec. 4, 2012.

* cited by examiner

FIG. 5

|  | Function (select using "star" operating mode): | "Up/down list" operating mode: | "Left/ right menu" operating mode: |
|---|---|---|---|
| I. | contact others by phone/sms | select from list of contacts, each with telephone number | select from among actions including 1. Make a telephone call; 2. write/generate sms; edit telephone number of a contact; Record a verbal note on the contact; ... |
| II. | view SMS's | select from list of sms's – combined list of outgoing and incoming SMS | select from among actions: read ; delete; reply; multiple delete |
| III. | order books | select from list of books that can be ordered in abc order | select from among actions: mark as favorite; start download; order in Braille format; send recommendation to a friend |
| IV. | read book | select from list of chapters in the book | select from among actions: read/pause; move to next chapter; move to previous chapter; return to get the chapters list; change reading speed; mark as a bookmark/ read me this chapter . |
| V. | system notification | select from list of system notifications: (up/down) battery status; connectivity to Wi-Fi; Reception status; history of events (missed calls, end of books download activity) | select from among Actions related to specific capabilities - actions for Wi-Fi connectivity = connect; remember for automatic connection; disconnect. Actions for history of events = reply; delete; say the full event information; mark for future activity |
| VI. | Location information | select from List of pre-defined location: current location; home; office; Library for the blinds; My bank branch; my healthcare provider | select from among Actions on a specific location: say address; navigate to this location; delete; send address to ... |
| VII. | view calls (call history) | select from a list of incoming calls, outgoing calls, and missed calls registered in the system during normal operations | select from among Actions on a specific call event: read details; delete; call back; add to contacts |

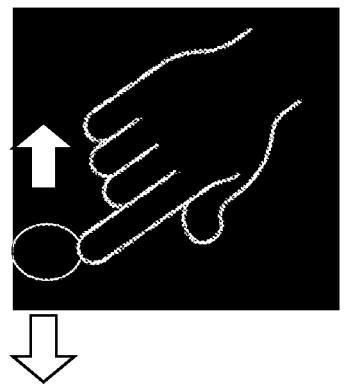
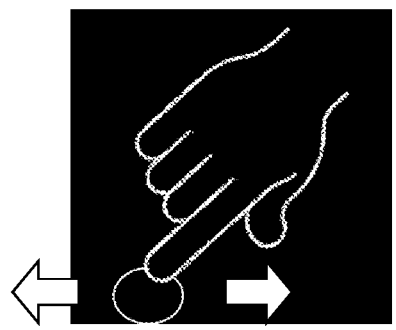
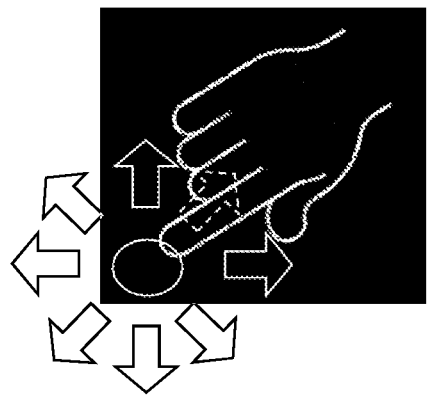
Fig. 6

FIG. 7

Operation 710: User turns on the device by hitting the power-button.
Operation 720: During the startup process the device omits a continuous stream of short beeps and short vibrations to indicate that the device is starting up.
Operation 730: Once the system is ready for active engagement with the user, it plays a special starting tone to indicate to the user that it is ready. From this point on, the interaction between the user and the device typically follows a standard pattern e.g. as per some or all of the steps of some or all of Figs. 8 – 10, typically sequentially.

FIG. 8

Operation 810: The default entity the system presents to users is a HOME or star-formatted - entity; optionally a representative screen e.g. illustrating selections arranged in a star, may be presented such that the term "screen" is sometimes used herein to indicate the operating mode represented by the screen. The HOME screen or operating mode is typically the only entity users can jump to from anywhere in the system e.g. using a predetermined special swipe.

↓

Operation 820: User puts the finger anywhere on the touch-screen and the system reacts with a tone and/or vibration, at least one of which is typically unique for the HOME-entity so as to provide a clear indication to the user that s/he is in HOME.

↓

Operation 830: User moves the finger at a 270 degree angle (to the left). This move, one out of, say, eight directional-moves corresponding to the up to 8 selection locations in the star, happens to be the pre-defined choice for the book-reading application. The system detects finger move on the screen, identifies it as a directional move e.g. because the move is relatively long and relatively straight, and identifies the angle as being closest to 270 degrees as opposed to other possible angles around the star.

↓

Operation 840: The system provides confirmation e.g. orally states "BOOKS" to indicate the user's selection to her or him.

↓

Operation 850: The user lifts his finger up, detaching it from the touch-surface, to finalize the selection of the BOOKS function (also termed herein "capability" or "group of actions"); the operations of Fig. 9 are then initiated. Or, if the user decides not to activate the BOOK capability, he drags his finger out of the device surface to cancel the touch in which case the system remains in HOME entity and awaits further user action.

FIG. 9

Operation 910: The user is now within the BOOKS function, so placing his finger on the screen brings him to a LIST-entity presenting books available for listening.

Operation 920: Upon placing a finger on the screen the user is played an orientation signal e.g. tone and/or vibration that is or are unique to the LIST-entity.

Operation 930: The user may also hear the words 'My books' to provide an additional orientation message designating the current function or capability.

Operation 940: The user moves the finger up; and hears the name of the first book in the list. He keeps his finger on the screen with no further movement and listens to the books in the list one by one. The list may be circular such that having reached the end, the list starts from the beginning again. If the user moves his finger out of the screen, the entire touch is cancelled.

Operation 950: When the user hears the book he is interested in, he lifts the finger and the operations of Fig. 10 are then initiated.

FIG. 10

Operation 1010: The current operating mode is now within the ACTION-entity (also termed horizontal-menu entity) of the selected book.

↓

Operation 1020: The user puts the finger on the screen and gets an orientation signal e.g. tone and/or vibration that is unique to the ACTION-entity.

↓

Operation 1030: The user typically also hears a verbal note with the name of the selected book.

↓

Operation 1040: The user moves the finger to a selected horizontal direction e.g. to the right to go through the different action options including say, some or all of: READ, NEXT, Previous, Change speed, Chapters list. Upon hearing the READ option, the user lifts the finger up to choose the capability.

↓

Operation 1050: The system starts playing the recorded book to the user.

INTERFACE LAYER AND OPERATING SYSTEM FACILITATING USE, INCLUDING BY BLIND AND VISUALLY-IMPAIRED USERS, OF TOUCH-SCREEN-CONTROLLED CONSUMER ELECTRONIC DEVICES

REFERENCE TO CO-PENDING APPLICATIONS

Priority is claimed from U.S. provisional application No. 61/524,338, entitled "Method And System For Providing Special User-Interface For Touch-Sensitive Screens For The Use By Visually Impaired People In Eye-Free Mode" and filed 17 Aug. 2011.

FIELD OF THIS DISCLOSURE

The present invention relates generally to electronic devices and more particularly to touch-screen controlled electronic devices.

BACKGROUND FOR THIS DISCLOSURE

General activities have become increasingly dependent on electronic devices, such as computers and smart phones. Such devices have embedded computers to control the functioning of the electronic device. These computers often utilize touch-sensitive screens to input and output information.

A touch-sensitive screen is a display device through which a computer can, in addition to displaying information, receive information by sensing a user's touch on the touch-sensitive screen. The computer generally displays various objects, such as icons or text, on the touch-sensitive screen. These objects typically represent the capabilities, information stored in it and commands that can be performed by the electronic device. For example, an icon representing a book may represent the command to start streaming an audio file.

Because a user needs to see a conventional touch-sensitive screen to use it, conventional touch-sensitive screens on electronic devices make the devices virtually inaccessible for visually impaired users. A touch-sensitive screen displays text, which a visually impaired user may not be able to read. In addition, the flat touch-sensitive screen has no physically raised buttons for a visually impaired user to feel. Instead, touch-sensitive screens utilize a graphical symbol to represent a button, so a visually impaired user may not be able to find buttons on a touch-sensitive screen. Also, many touch-sensitive screens display text and graphical symbols in low contrast relative to the background color of the touch-sensitive screen which makes the use of a touch-sensitive screen challenging even to users who do have limited sight i.e. are not totally blind. Moreover, different devices typically display text, icons and controls at different locations on their touch-sensitive screens. For instance, one device may place buttons at the top of the touch-sensitive screen and another may place them at the right side of the touch-sensitive screen. Because of the number and variety of these differences, it is not easy for a user who is visually impaired to memorize these differences and thus use these devices. In addition, a single-touch sensitive screen typically displays different text and graphical symbols depending on context, which makes it difficult for a user who is visually impaired to memorize the differences even on a single touch-sensitive screen.

The community of visually impaired users is large, including users who may have limited vision as well as users who have lost all vision. Because of widespread use of touch-sensitive screens on electronic devices in daily life, visually impaired users are finding it increasingly difficult to effectively use such devices.

Published US Patent Application US 2010/0083329 to Raman et al describes a user interface in which telephone keys are associated with a direction which is input relative to a location of user contact.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a method and system for providing a user-interface for touch-sensitive screens for the use by visually impaired people in eye-free mode.

Certain embodiments of the present invention seek to provide a method and system for enabling visually impaired users to use touch-sensitive devices in eye-free mode.

Certain embodiments of the present invention seek to provide an interface for the visually impaired system (also termed herein "RAY") which enables a visually impaired user to use a touch sensitive screen.

A user may execute a control, such as a menu item, by dragging a finger onto the control, lifting the finger off of the touch-sensitive screen. A system shown and described herein further enables a user to scroll through lists on a touch-sensitive screen. In particular, the system shown and described herein enables a user to use a finger to scroll through a list. When a user drags the finger over the list, and then lifts the finger off of the touch-sensitive screen, the system selects the listed item.

A system shown and described herein announces objects as a user touches them. For example, a system shown and described herein announces text or plays a recorded file as it is touched and listed. It also announces controls, such as menu options, as they are touched. In addition, the system shown and described herein enables a user to execute controls by invoking a correspondent program associated with a menu option.

A system shown and described herein also provides a training mode and wizard in which a visually impaired user may calibrate the sequence of events and response timing of the touch-sensitive motion control sensors.

Certain embodiments of the present invention seek to provide a method and system for using touch-sensitive screens effectively in eye-free mode, and more specifically, for enabling visually impaired users to use touch-sensitive screens to control various devices.

The present invention typically includes at least the following embodiments:

Embodiment 1

A method in a computer system for selecting a control item of a touch-sensitive panel from among a plurality of control items that are on display, the method comprising the steps of:
  determining whether a user is contacting the touch-sensitive panel over a control item;
  determining whether a user is moving a finger between one control item to another;

determining whether the user has terminated contact with the control item;

when the user has terminated contact with the control item by releasing contact from the touch-sensitive panel over the control item, selecting the control item;

Embodiment 2

The method of Embodiment 1 wherein the touch-sensitive panel is a touch-sensitive screen and including the step of displaying an indication of each of the control items on the touch-sensitive screen.

Embodiment 3

The method of Embodiment 1 including, when the user first contacts the touch-sensitive panel over a control item, providing audio feedback indicating the user has pointed at the control item.

Embodiment 4

The method of Embodiment 1 wherein each of the control items has an associated function, and including the steps of executing the function associated with the selected control item and providing audio feedback indicating execution of the function associated with the selected item.

Embodiment 5

A method in a computer system for selecting a list item of a touch-sensitive panel from among a plurality of list items that are on display, the method comprising the steps of:

determining whether a user is contacting the touch-sensitive panel over a list item;

determining whether a user is moving a finger between one list item to another;

determining whether the user has terminated contact with the list item;

when the user has terminated contact with the list item by releasing contact from the touch-sensitive panel over the list item, selecting the list item;

Embodiment 6

The method of Embodiment 5 wherein the touch-sensitive panel is a touch-sensitive screen and including the step of displaying an indication of each of the list items on the touch-sensitive screen.

Embodiment 7

The method of Embodiment 5 including, when the user first contacts the touch-sensitive panel over a list item, providing audio feedback indicating the user has pointed at the list item.

Embodiment 8

The method of Embodiment 5 wherein each of the list items has an associated function, and including the steps of executing the function associated with the selected list item and providing audio feedback indicating execution of the function associated with the selected item.

It is an object of certain embodiments of the present invention to enable a visually impaired user to effectively use touch-screen enabled devices by exploring the objects on a touch-sensitive screen using their finger movement on it.

It is another object of certain embodiments of the present invention to enable a visually impaired user to select controls displayed on a touch-sensitive screen.

It is yet another object of certain embodiments of the present invention to enable a visually impaired user to scroll through lists on a touch-sensitive screen by sliding a finger.

Certain embodiments of the system shown and described herein provide a method for selecting a control element (icon, text in a list, command and such) that is displayed on a touch-sensitive screen. The touch-sensitive screen has icons which are associated with a command. The system shown and described herein determines whether a user is contacting the touch-sensitive screen over a control icon. When the user is moving a finger on the touch-sensitive screen over control icons, the system shown and described herein determines whether the user has lifted the finger from the touch-sensitive panel while pointing at the control icon. When the user has lifted the finger from the touch-sensitive screen, the system shown and described herein selects the control icon and performs the command.

Certain embodiments of the system shown and described herein use a similar method for selecting items in a list. Another aspect of a preferred embodiment of the system shown and described herein provides a method of scrolling through a list of list items. Certain embodiments of the system shown and described herein determine whether the user continues contacting the list of items. If the user continues contacting the touch-screen, the system shown and described herein keeps scrolling through the list of items, providing audio feedback in the form of text to speech play or a playing of a pre-recorded audio file associated with the item. Then, the system shown and described herein may determine whether the user lifts the finger from the touch-screen and subsequently terminates contact with the touch-sensitive screen. When the user has lifted the finger from the touch-sensitive screen, the system shown and described herein selects the list item and uses it to perform an action or command.

Using a method and system according to one embodiment, a user selects an object by touching and moving the finger on a touch-sensitive screen, moving between different displayed objects. When moving on a selected object, an audio message is played using automatic conversion from text to speech or by playing a pre-recorded audio file. When the user lifts the finger from the screen, the computer determines which object is selected by determining which object is displayed at the location the user lifts the finger. By selecting an object, the user indicates to the computer that an associated command should be performed or an associated object should be selected. For example, when a "start" button is selected by a user, then an audio previously selected is played on the device speakers and when an item in a list is selected, then the item may be highlighted.

Certain embodiments of the present invention seek to provide a smart phone which is suitable for blind users.

Certain embodiments of the present invention seek to provide a method for users to interact with computing systems that are based on a touch-screen interface, in eye-free mode—with no need to look at the screen, and to assign a user's touch-point selection to a specific location on the screen.

Certain embodiments of the present invention seek to provide a standard interface layer for any touch surface with no requirement for physical buttons or special keys. The interaction occurs in eye-free mode and does not require looking at the screen so as to position a pointing device/pointing finger at a precise location on the screen. This interface can be implemented on any electronic device useful in conjunction with a touch screen e.g. mobile devices such as but not limited to smartphones and tablets; computing systems e.g. PC; embedded devices e.g. banking tellers and information kiosks. The special interface layer is advantageous inter alia for visually impaired, including totally blind users interacting with a computing system, for interaction with an electronic device in problematic lighting situations, and for interaction when screen display is undesirable e.g. when driving a car.

Certain embodiments of the present invention seek to provide virtual selection of programmable items.

Certain embodiments of the present invention seek to provide a full operating environment and user interface layers which employ only directional-dragging techniques; thereby obviating, for example, voice recognition functionality since the user need not provide any oral inputs.

Certain embodiments of the present invention seek to provide an API (application programming interface) which provides dynamic and/or virtual translation of directional-dragging inputs into an action.

Certain embodiments of the present invention seek to provide a user with computerized cues indicating orientation within a workflow including directional cues indicating a position within a workflow sequence characterized by positions which are each associated with a different direction e.g. each expect user motions in certain directions.

In accordance with an aspect of the presently disclosed subject matter, there is provided a computerized system for facilitating eye-free use of an electronic device, including by blind users, the system comprising:

a computerized interface layer including a hierarchy of operating modes for presenting at least a portion of a respective hierarchy of possible choices to a user, each portion comprising a sequence of possible users' choices within said hierarchy; and an operating system for accepting, via a touch screen, a sequence of selected options generated by the user responsive to the sequence of possible choices respectively, and for activating functionalities of the electronic device accordingly, wherein the hierarchy of possible choices includes at least some sequences of n possible choices which are presented within respective sequences of n operating modes having n respective predetermined archetypical formats each having at least one fixed characteristic, and wherein the interface layer includes an orientation signal generator operative for generating a plurality of orientation signals, sensible by the user, which are uniquely associated with the n archetypical formats respectively, wherein generation of each orientation signal coincides with presentation of its associated archetypical format, thereby to orient the user, even if blind, within said hierarchy.

In accordance with an embodiment of the presently disclosed subject matter, there is further provided a system wherein the formats include a star format in which choices are virtually arranged in a north-south-east-west star such that motion of a user's finger on the touch screen, relative to an initial location, is classified as being one individual direction from among up to 8 directions defined by the star and is interpreted, if not accompanied by a selection gesture, as a request to the computerized interface layer to orally present a choice associated with the individual direction and if accompanied by a selection gesture, as a request to the operating system to effect the choice associated with the individual direction.

In accordance with an embodiment of the presently disclosed subject matter, there is yet further provided a system wherein the formats include a list format in which choices are virtually arranged to form a vertical, up-down list such that motion of a user's finger on the touch screen, relative to an initial location is classified as being one individual direction from among {up, down}, and is interpreted, if not accompanied by a selection gesture, as a request to the computerized interface layer to orally present a choice associated with the individual direction, and, if accompanied by a selection gesture, as a request to the operating system to effect the choice associated with the individual direction.

In accordance with an embodiment of the presently disclosed subject matter, there is yet further provided a system wherein the formats include a menu format in which choices are virtually arranged to form a horizontal, left-right menu such that motion of a user's finger on the touch screen, relative to an initial location is classified as being one individual direction from among {left, right}, and is interpreted, if not accompanied by a selection gesture, as a request to the computerized interface layer to orally present a choice associated with the individual direction, and, if accompanied by a selection gesture, as a request to the operating system to effect the choice associated with the individual direction.

In accordance with an embodiment of the presently disclosed subject matter, there is yet further provided a system wherein the sequence of archetypical formats includes one of the star and menu formats, followed by the list format.

In accordance with an embodiment of the presently disclosed subject matter, there is yet further provided a system wherein the sequence of archetypical formats includes one of the star and (e.g. horizontal) menu formats, followed by the (e.g. vertical) list format, followed by another one of the star and menu formats.

In accordance with an embodiment of the presently disclosed subject matter, there is yet further provided a system wherein the sequence of archetypical formats includes the star format, followed by the list format, followed by the menu format.

In accordance with an embodiment of the presently disclosed subject matter, there is yet further provided a system wherein the hierarchy of possible choices to a user includes only one sequence of possible choices within the hierarchy.

In accordance with an embodiment of the presently disclosed subject matter, there is yet further provided a system wherein the plurality of orientation signals, sensible by the user, which are uniquely associated with the n archetypical formats respectively, each include a musical tone varying in at least one predetermined characteristic so as to uniquely represent each of the n archetypical formats.

In accordance with an embodiment of the presently disclosed subject matter, there is yet further provided a system wherein the predetermined characteristic comprises pitch.

In accordance with an embodiment of the presently disclosed subject matter, there is yet further provided a system wherein the orientation signal generator comprises a directional vibration generator operative to generate a selectable one of an up-directed vibration and a down-directed vibration, to signify a user's motion up or down the list.

In accordance with an embodiment of the presently disclosed subject matter, there is yet further provided a system wherein the orientation signal generator comprises a directional vibration generator operative to generate a selectable one of a right-directed vibration and a left-directed vibration, to signify a user's rightward or leftward motion within the menu.

In accordance with an embodiment of the presently disclosed subject matter, there is yet further provided a system wherein a user can instruct the computerized interface layer to move up or down the list at a selectable one of two progress modes, by moving one finger or two fingers, respectively, up or down relative to an initial location of the finger/s.

In accordance with an embodiment of the presently disclosed subject matter, there is yet further provided a system wherein the list comprises alphabetized items and wherein a first of the two progress modes moves from item to item whereas a second of the two progress modes moves from letter to letter thereby to yield more rapid motion within the list.

In accordance with an embodiment of the presently disclosed subject matter, there is yet further provided a system wherein choices are made by motion of a user's finger, relative to an initial location, of at least a predetermined threshold magnitude, whereas motion of a user's finger, relative to an initial location, of less than the predetermined threshold magnitude, are not interpreted as choices.

In accordance with an embodiment of the presently disclosed subject matter, there is yet further provided a system wherein the computerized interface layer is operative to orally present choices in a predetermined sequence and wherein the orientation signal generator comprises a directional vibration generator operative to generate a vibration having at least two controllable directions, to signify that the choices are being presented forward or backward respectively.

In accordance with an aspect of the presently disclosed subject matter, there is yet further provided a method for facilitating eye-free use of an electronic device, including by blind users, the method comprising:

providing a computerized interface layer including a hierarchy of operating modes for presenting at least a portion of a respective hierarchy of possible choices to a user, each portion comprising a sequence of possible users' choices within the hierarchy; and using an operating system for accepting, via a touch screen, a sequence of selected options generated by the user responsive to the sequence of possible choices respectively, and for activating functionalities of the electronic device accordingly, wherein the hierarchy of possible choices includes at least some sequences of n possible choices which are presented within respective sequences of n operating modes having n respective predetermined archetypical formats each having at least one fixed characteristic, and wherein the interface layer includes an orientation signal generator operative for generating a plurality of orientation signals, sensible by the user, which are uniquely associated with the n archetypical formats respectively, wherein generation of each orientation signal coincides with presentation of its associated archetypical format, thereby to orient the user, even if blind, within the hierarchy.

In accordance with an aspect of the presently disclosed subject matter, there is yet further provided a computer program product, comprising a non-transitory tangible computer readable medium having computer readable program code embodied therein, said computer readable program code adapted to be executed to implement a method for facilitating eye-free use of an electronic device, including by blind users, the method comprising providing a computerized interface layer including a hierarchy of operating modes for presenting at least a portion of a respective hierarchy of possible choices to a user, each portion comprising a sequence of possible users' choices within said hierarchy; and using an operating system for accepting, via a touch screen, a sequence of selected options generated by the user responsive to the sequence of possible choices respectively, and for activating functionalities of the electronic device accordingly, wherein the hierarchy of possible choices includes at least some sequences of n possible choices which are presented within respective sequences of n operating modes having n respective predetermined archetypical formats each having at least one fixed characteristic, and wherein the interface layer includes an orientation signal generator operative for generating a plurality of orientation signals, sensible by the user, which are uniquely associated with the n archetypical formats respectively, wherein generation of each orientation signal coincides with presentation of its associated archetypical format, thereby to orient the user, even if blind, within the hierarchy.

Also provided, excluding signals, is a computer program comprising computer program code means for performing any of the methods shown and described herein when the program is run on a computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 5 is a table presenting a hierarchy of possible choices which the computerized interface layer of FIG. 4 may present to a user who may be visually impaired or blind, typically such that on various occasions, various portions of the hierarchy of possible choices are presented.

FIG. 6 is a pictorial illustration of expected directional inputs, e.g. finger motions at a particular angle relative to an initial arbitrary location of the user's finger on the screen, when a current operation mode employs the star, list and menu formats respectively, in accordance with an embodiment of the present invention.

FIGS. 7-10 are simplified flowchart illustrations of an example step by step session during which a blind user easily utilizes an interface and operating system constructed and operative in accordance with an embodiment of the present invention, to listen to a stored audio book using a touch screen based device such as a smartphone, and in particular:

Starting up operations are illustrated in FIG. 7;

Operations occurring within a first, home or "star" operating mode are illustrated in FIG. 8;

Operations occurring within a second "list" are illustrated in FIG. 9; and

Operations occurring within a third, "horizontal menu" are illustrated in FIG. 10.

Figure 12:
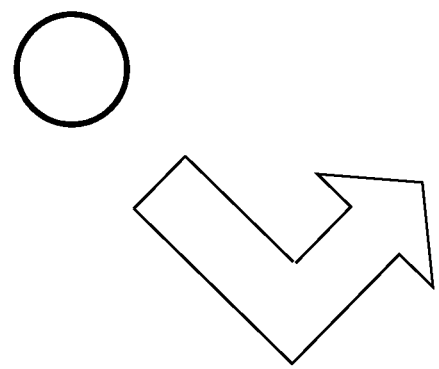
Figure 11:
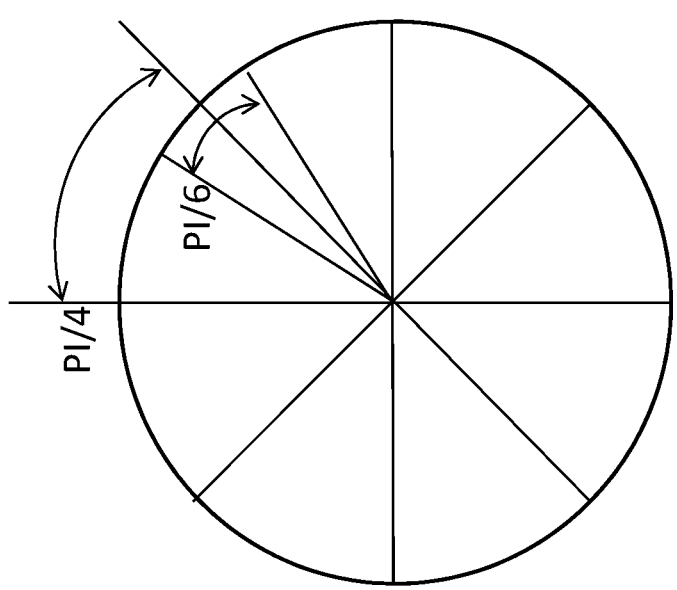
Figure 13:
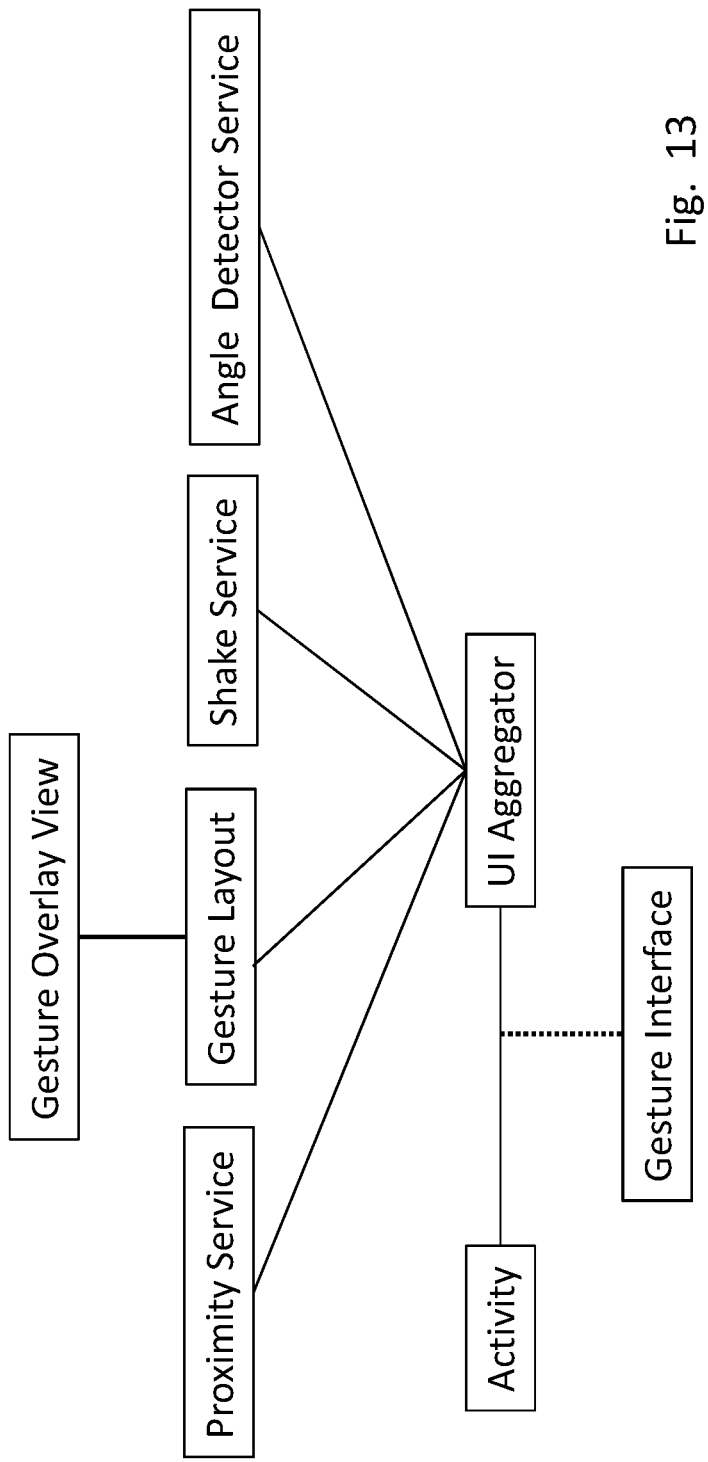

FIGS. 11-13 are useful in understanding gesture recognition functionality provided according to one embodiment of the present invention.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
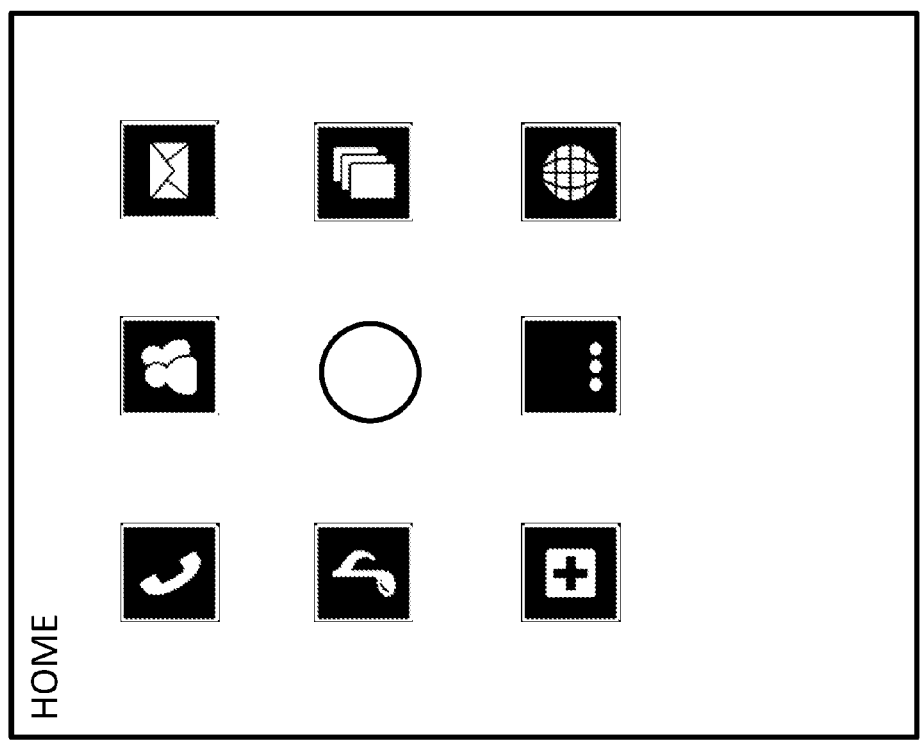
FIG. 1 illustrates a touch-sensitive screen with icons used for menu and application selection, all constructed and operative in accordance with an embodiment of the present invention.

FIG. 1 illustrates a conventional touch-sensitive screen with a touch point and eight menu options. Each of the icons represents a command to be performed by the device. When a user move his finger on the touch-screen device, he moves between the different menu options, feel vibrations from the device when he moves from one menu option to another, and listen to the audio stream that indicates the specific action associated with the icon. For example, when the user selects the book icon by lifting the finger after selecting this specific icon, the device invokes the books menu option.

Figure 2:
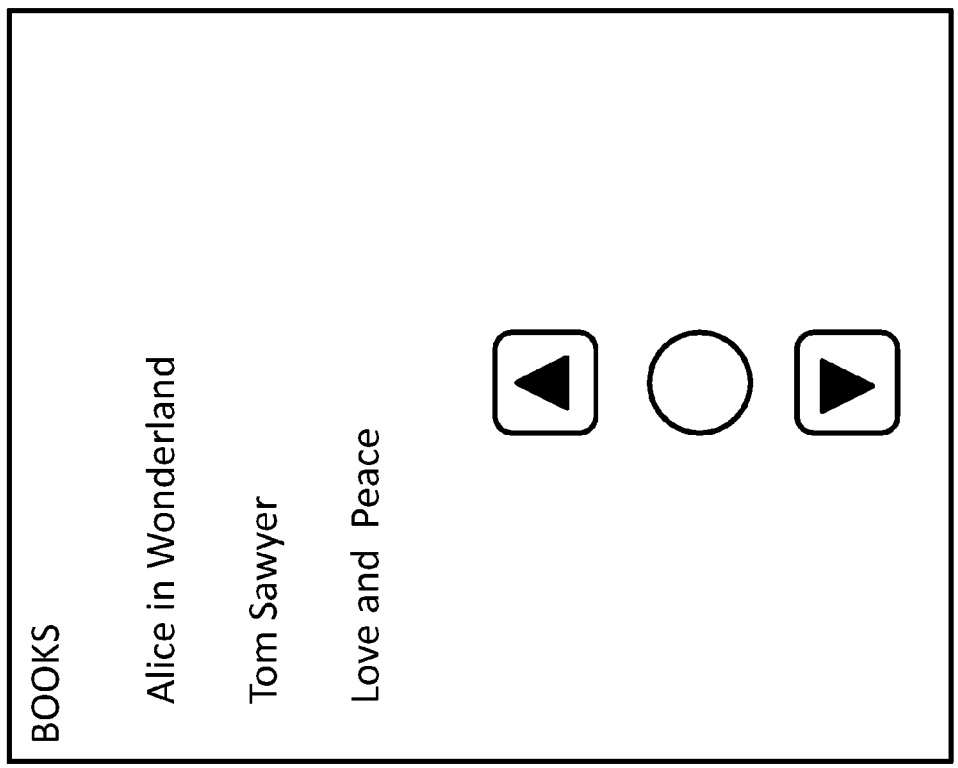
FIG. 2 illustrates a touch-sensitive screen with item list used for item selection within a list of items, all constructed and operative in accordance with an embodiment of the present invention.

An electronic device may also display a list of data on a touch-sensitive screen. FIG. 2 illustrates a sample list of items. If the list contains more list items than can be displayed on the screen at one time, then the user can continue moving the finger, and scroll through the list until it hits and hears the item he is looking for. By lifting the finger after the selected list item is highlighted and heard, the list item is selected.

Certain embodiments of the present invention provide a method and system for enabling a visually impaired user to use a touch-sensitive screen in an effective manner. The touch-sensitive screen contains visual display which enables a user who is not visually impaired to use the device. The interface for the visually impaired (also termed herein "RAY") system in a preferred embodiment provides audio feedback to a user of a touch-sensitive screen to enable a visually impaired user to use the touch-sensitive screen. In an explore mode of the RAY system, a visually impaired user may determine which objects are displayed on the touch-sensitive screen by touching the touch-sensitive screen with a finger and then dragging the finger over the touch-sensitive screen. As the visually impaired user touches an object while dragging the finger, the system shown and described herein announces text associated with the touched object using text to speech system or by playing a pre-recorded audio file associated with the touched object. For example, if the visually impaired user touches and lifts the finger over a displayed icon, the system shown and described herein announces the text associated with that icon. When a user lifts his finger from the displayed icon, a command associated with the icon is typically performed.

Certain embodiments of the system also enable a visually impaired user to scroll through a list. When a user touches the screen and moves a finger in a specific direction, the system shown and described herein starts moving between the different items in the list and plays an audio feedback for each item in the list. When a user lifts his finger the system shown and described herein determines the specific item within the list that the user chooses, and performs an action for the item.

Because a visually impaired user may not be able to see the scroll list, the RAY system, while in scroll mode, allows a user to drag their finger anywhere on the touch-sensitive screen. The system shown and described herein interprets the user's finger position to correspond to a vertical position on the scroll list and scrolls the list accordingly.

Although the system shown and described herein has been described in terms of visually-impaired people usage, it may be used by any user in eye-free operation mode.

Although certain embodiments of the system shown and described herein have been described in terms of visual display, the use of a visual display is not necessary for the visually impaired. For example, neither text nor graphical symbols can be seen by visually impaired users who have lost all vision, and these are typically not seen clearly by visually impaired users who have limited vision, and so it is not necessary to actually display these.

Figure 3:
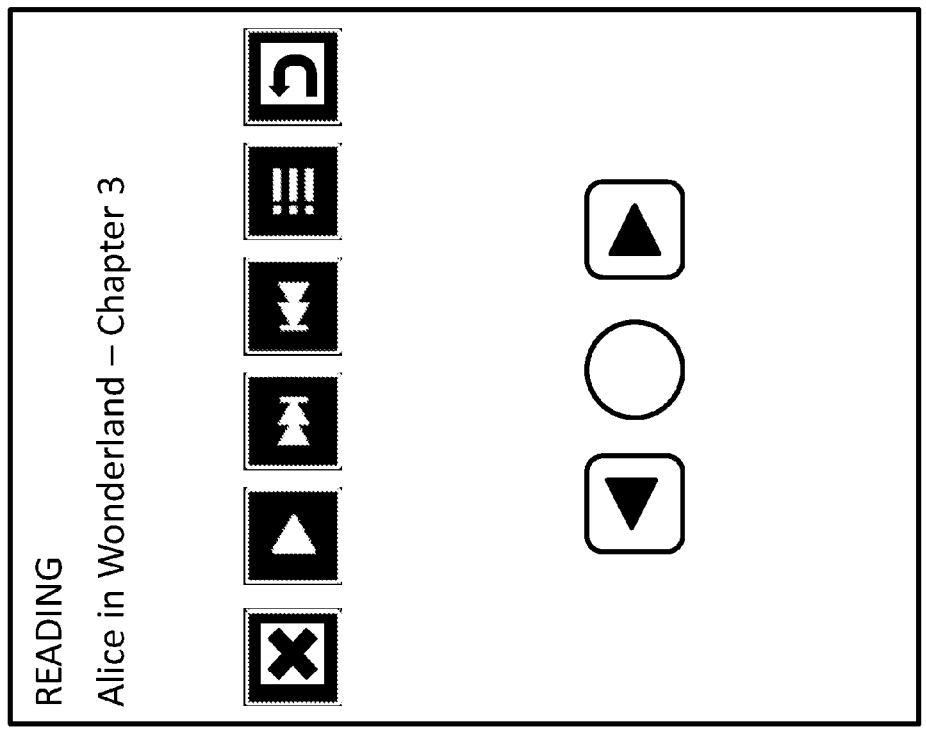
FIG. 3 illustrates a touch-sensitive screen with command icons used for command selection, all constructed and operative in accordance with an embodiment of the present invention.

It is appreciated that the drawings illustrate only an example implementation and other implementations would occur to an ordinarily skilled man of the art. For example, the particular choices, whether represented by icons and/or by voice, are merely exemplary. The choices illustrated in FIG. 3 may for example include some or all of the following: pause; forward; fast forward; fast backward; list of chapters in current book.

Figure 4:
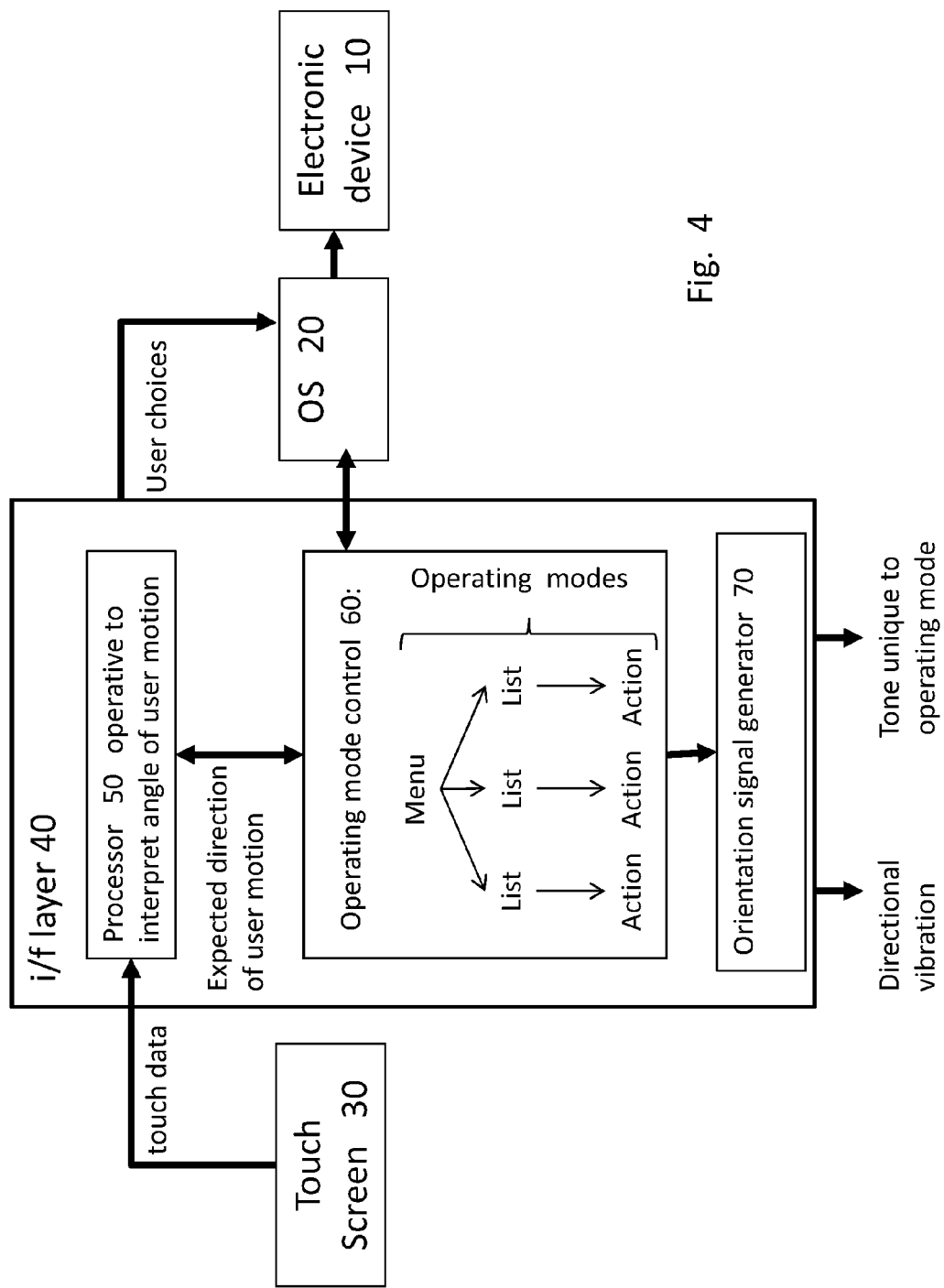
FIG. 4 is a simplified functional block diagram illustration of a computerized system for facilitating eye-free use of an electronic device such as but not limited to a smartphone, including by blind users, constructed and operative in accordance with an embodiment of the present invention.

Reference is now made to FIG. 4 which is a simplified block diagram illustration of a computerized system for facilitating eye-free use of an electronic device 10, including by blind users, constructed and operative in accordance with another embodiment of the invention. The system of FIG. 4 typically includes some or all of an operating system 20, a touch screen 30 such as a conventional off-the-shelf touch screen, and an interface layer 40 which may include:

a. a processor 50 operative to interpret touch data arriving from the touch screen, typically by interpreting angles of user strokes relative to an initial user finger position, typically in accordance with expected directions of user strokes provided by an operating model control unit 60, as described in detail below. For example, in a "star" operating mode, expected directions may include 4 or 8 conventional directions such as north, south, east, west (corresponding to up, down, right, left) or such as north, south, east, west and additionally, north-east, north-west, south-east, south, west. In a vertical list operating mode, expected directions may include up and down. In a horizontal menu operating mode, expected directions may include right and left.

b. operating model control unit 60 c. orientation signal generator 70.

The components of the system of FIG. 4 are now described in detail.

The electronic device 10 may for example comprise any of the following: mobile telephone, smart phone, playstation, iPad, TV, remote desktop computer, game console, tablet, mobile e.g. laptop or other computer terminal, embedded remote unit or any other consumer electronic device or household device.

The operating system 20 may for example be based on an Android open-source operating system and may include some or all of a sensor framework, gesture framework, text-to-speech functionality, voice recognition functionality and location and navigation functionality, all conventional except as shown and described below. Generally, certain embodiments of the present invention such as that of FIG. 4 may be operative in conjunction with off-the-shelf hardware such as smartphone hardware thereby greatly reducing costs for blind users who would otherwise require expensive customization of hardware for their needs.

The computerized interface layer 40 is operative for providing a hierarchy of operating modes, or other computer environment entities, and operative for presenting at least a portion of a respective hierarchy of possible choices to a user, each portion comprising a sequence of possible users' choices (e.g. choices of functions) within said hierarchy. The user interface layer 40 may include a launcher, widgets e.g. EF UI (Entity Framework user interface) widgets, touch and motion controls, audio and haptic functionality, all conventional except as shown and described below.

Examples of functions to be chosen may be in accordance with the table of FIG. 5, described in detail below.

Presentation of choices to a user, who may be blind, may include:

a. initially, orally uttering the up-to-8 functions above, in turn, responsive to a user moving his finger on the touch screen, relative to an initial finger position, in one of 8 directions respectively. For example, the first to eighth functions above might be uttered responsive to a user moving his finger on the touch screen, relative to an initial finger position, in the following 8 directions respectively: north, north-east, east, south-east, south, south-west, west, north-west respectively, where north, east, south and west refer to motion directly toward the top, right, bottom and left sides of the screen respectively.

b. subsequently, responsive to a selection, using a predetermined selecting-gesture, of one of the up-to-8 functions above, orally uttering the items of the list below the selected function, typically responsive to directional instructions from the user indicating whether to move down the list or up the list, from a current position in the list.

For example, the selecting-gesture may include removing the finger from the screen, after moving that finger, relative to an initial finger position, in one of the 8 directions respectively.

c. subsequently, responsive to a selection, using a predetermined selecting-gesture, of one of the up-to-8 functions above, orally uttering the items of a menu below the selected function, typically responsive to directional instructions from the user indicating whether to move right or left along the menu items, from a current position in the menu.

It is seen that each hierarchy portion presented to the user comprises a sequence of possible choices within said hierarchy. For example, on one occasion the sequence of possible choices might be: the 8 functions (choice 1), the contacts in the user's contact list (choice 2, if function I is selected) and last, which action to perform e.g. call, sms, edit, record verbal note (choice 3). On another occasion the sequence of possible choices might be: the 8 functions (choice 1), one of the user's stored SMS's (choice 2 if function II is selected) and last, which action to perform e.g. read, delete, reply etc. (choice 3).

Still with reference to FIG. 4, operating system 20 is operative for accepting, via a touch screen, a sequence of selected options generated by the user responsive to the sequence of possible choices respectively, and for activating functionalities of the electronic device 10 accordingly. A hierarchy of possible choices includes at least some sequences of n possible choices which are presented within respective sequences of n operating modes (3 in the illustrated embodiment, merely by way of example) having n respective predetermined archetypical formats (3 in the illustrated embodiment—star, list, horizontal menu as described below) each having at least one fixed characteristic.

The operating system then accepts, via the touch screen 30, a sequence of selected options generated by the user responsive to the sequence of possible choices respectively, interprets these using processor 50, and activates functionalities of the electronic device 10 accordingly. For example, following the first example above, the selected options might be: contact others by phone/sms, contact to be contacted=joe smith, action to be initiated is "call". In this case, the operating system would accept this sequence and put through the call. To give another example, following the second example above, the selected options might be: viewed stored SMSs, SMS to be viewed is that received on Tuesday from Joe smith, action to be initiated is "read". In this case, the operating system would accept this sequence and, typically, orally read the selected SMS to the user.

Typically, each sequence of choices is presented in accordance with a respective sequence of archetypical formats. In the example of FIG. 5, the sequence of archetypical formats includes:

a. a first archetypal "star" format in which directional inputs received from a user correspond to i.e. are interpreted as any of the following "star" directions respectively: north, north-east, east, south-east, south, south-west, west, north-west.

b. a second archetypal "list" format in which directional inputs received from a user correspond to i.e. are interpreted as only the 2 vertical directions i.e. up/down or north/south.

c. a third archetypal "horizontal menu" format in which directional inputs received from a user correspond to i.e. are interpreted as only the 2 horizontal directions i.e. left/right or east/west.

FIG. 6 is a pictorial illustration of expected directional inputs, e.g. finger motions at a particular angle relative to an initial arbitrary location of the user's finger on the screen, when the operation mode employs the star, list and horizontal menu formats respectively.

For example, in the table of FIG. 5, choice of function may be in accordance with the first format, and choices 2, 3 under each function may be in accordance with the second and third formats respectively.

Typically, choices between a large number (say, between 20, and hundreds or more) of options which have a defined order, are made in (b) i.e. by means of an up/down list. For example, contacts have a defined order between them—alphabetical order. Choices between a very small number (say, 2-3) of options are made in (c) i.e. by means of an east/west menu. Choices between an intermediate number of options (say, 4, 8, 9-20) are made by means of the 8-directional, first archetypical format. If more than 8 options exist, the first 7 may be presented together with an eighth "more" option which, if selected, causes the first archetypal format to be repeated, this time presenting an additional up to 8 options or an additional 7 options plus another "more" option leading to still more options, again 7-8 in number, and so forth.

Typically, the star (or horizontal menu) format is used to enable a user to select a choice between groups of actions, operations or functions. The vertical list format is used to enable a user to select a choice between a parameter which is typically joined to several or all actions, operations or functions in the group such as selecting a contact from an alphabetical list thereof which may be joined to several of the conventional actions, operations or functions provided on conventional cellular telephones. The horizontal menu format is used to enable a user to select a choice between individual actions, operations or functions in the group.

Directional inputs from users may be interpreted relative to an initial position, e.g. as described in the above-referenced Published Patent Application to Raman.

It is appreciated that any other suitable sequence of archetypical formats may be employed, such as but not limited to:

c, then b then a.

a, then b.

a, then c, then b.

It is appreciated that the computerized interface layer 40 of FIG. 4 may present less than all possible sequences of possible choices in accordance with the pre-determined sequence of archetypical formats. For example, as above, if one of the 8 north-south-east-west options is "more" then effectively, the first archetypal format is sometimes repeated rather than being employed only once. Also, some selected options may trigger a deviation from the pre-determined sequence of archetypical formats. For example, one option may be "emergency" in which case no further inputs are sought from the user. Instead, the operating system may immediately send a distress signal including a self-location indication, e.g. using a GPS functionality, to a predetermined emergency number on behalf of the user. For example, certain functions may be designed differently; perhaps choice II of FIG. 5 might include a horizontal menu for selecting incoming/outgoing, after 1. function selection and before 2. contact list.

However, an appreciable subset of the possible choices is presented in accordance with the pre-determined sequence of archetypical formats.

It is appreciated that each archetypical format has at least one fixed characteristic. In the example of FIG. 5, the fixed characteristic is the relative arrangement of the input options which may be a star, vertical list and horizontal menu, in the above 3 formats respectively. It is appreciated that the relative arrangement of the input options may be, but need not actually be displayed on the touch screen, since vision capability on the part of the user is not assumed. However, interpretation of the user's motions by the system, is in accordance with either the star, vertical list or horizontal menu, in the above example. Other characteristics of each archetypical format may not be fixed, such as but not limited to the precise number of options in various vertical lists or in various horizontal menus.

Typically, an orientation signal generator 70 which may for example comprise apparatus for generating selectable single musical tones and/or apparatus for interfacing with a conventional API such as the APIs provided by iOS, Android or other conventional operating systems for general use by $3^{rd}$-party developers, for generating vibrations which are experienced as having a direction, is provided. The orientation signal generator 70 generates a predetermined orientation signal, sensible by the user, in a manner which coincides with presentation of an associated archetypical format e.g. the appropriate orientation signal is generated each time a archetypical format is about to be presented or as it is being presented.

For example, each time a star format is presented, a high-pitched tone (say) may be sounded. Each time a list format is presented, a medium-pitched tone may be sounded. Each time a horizontal menu format is presented, a low-pitched tone may be sounded. Or, each time a star format is presented, a raspy tone (say) may be sounded. Each time a list format is presented, a medium (between raspy and smooth) tone may be sounded. Each time a horizontal menu format is presented, a smooth tone may be sounded. It is appreciated that this is particularly useful in orienting the user, even if blind, within the hierarchy. Not only does the user know which format is being presented, the user also gets a sense of his position within the hierarchy because s/he knows that most "paths" through the hierarchy include, say, 3 choices, and if s/he hears a high, medium or low-pitched tone, or a tone varying along some other tone characteristic such as volume or smoothness, s/he then is cued that s/he is positioned at the first, second or third of those choices respectively.

In addition, of course, conventional verbal cues (e.g. reading aloud various choices) can be provided. However, provision of a single tone orientation signal as above is a very non-cumbersome, unobtrusive manner of providing orientation cues to orient a user, especially a blind user, within a computerized application having a defined, sequential e.g. hierarchical structure. The tone may be short or, particularly if very soft, the tone may continue for the duration of time in which the user is operating within the archetypical format associated with that tone.

In simple electronic devices, the hierarchy of possible choices to a user may include only one sequence of possible choices within said hierarchy. For example, a washing machine may have just one sequence of choices such as: which cycle to use, which temperature to use, and whether to drain water and spin, drain water but not spin, or neither, before terminating operation.

According to certain embodiments, the computerized interface layer 40 is operative to orally present choices in a predetermined sequence (e.g. to read off names of contacts either in 'a to z' order or in 'z to a' order) and the orientation signal generator 70 comprises a directional vibration generator operative to generate a user-sensible vibration sensation having at least two controllable directions, say up/down or left/right, to signify that the choices are being presented forward or backward respectively.

It is appreciated that conventional touch panels e.g. the touch panel available in conventional electronic devices such as but not limited to Smartphone devices, Tablets, Information kiosks, Teller Machines, provide vibration simulation functionality, typically generated by a vibration motor, that the user can feel while touching the screen. According to certain embodiments, the orientation signal generator 70 of FIG. 4 activates the vibration motor for a specific length of time and with a specific intensity/power to generate a desired direction. For example, short, weak vibrations that intensify to longer, stronger vibrations create a sensation of upward vibration whereas reversing the order creates a sensation of downward vibration. If it is desired to provide vibrations to signify a user's motion along a "star", short initial vibrations followed by longer vibrations and then short vibrations again, create a sensation of "circular" vibration.

The extent to which archetypical formats are accompanied by reading out the presented options, may depend on operation mode. In one operation mode for new users, options may be read out e.g. "in a clockwise direction starting from 12 o'clock" each time the star-format is presented. In another operation mode for experienced users, this may not occur. Only selected options may be read to the user for her or his confirmation.

In the example of FIG. 5, it is appreciated that each function has its own sequence of operating modes, also termed herein "data input modes". For example, the first function, I, in the table of FIG. 5 is implemented by a sequence of 3 operation modes; in the first, a selection of function (also termed herein "group of actions") I from among other functions is received from a user, in the second, a selection of a contact is received from a user, and in the third, a selection of a desired action to be applied to the contact, within the group of actions defined by the function, is received from a user. It is also appreciated that a hierarchy of operating modes results, since the first operating mode, selection of function, is common to all the functions (i.e. typically comprises selection of a function from among all of the functions I-VII), thereby to create a "tree" of operating modes in which each "branch" comprises the sequence of operating modes implementing one of the functions I-VII.

It is appreciated that the particular number of functions, and identity of functions, shown herein is merely exemplary and a wide variety of electronic device functions may be provided, instead or in addition, as well as any subset of the functions actually shown.

It is appreciated that the resulting user interface is convenient for the blind user. For example, if the user wishes to return all the calls s/he received during the day s/he goes to the relevant list of calls and for each call it is desired to return, selects the "call back" action for that call. Also, the interface enables conventional implementations to be preserved. For example, the VIEW CALLS function may be implemented with options to see All calls, Actual calls, Rejected calls, Missed calls.

Optionally, outgoing and incoming SMSs are provided as separate lists rather than as a single list. To do this, another MENU option may be added before the relevant LIST such that rather than user being given a single MENU option for all calls whether incoming or outgoing, a user is provided with, say, 2 separate horizontal menus—one for outgoing-calls and another for incoming calls. In each horizontal MENU item the user may have access to a LIST of all calls relevant to this request.

When possible, choices may be combined to create a full star with 8 possible functions to select. For example, a "history" star may be provided which includes 8 functions: view incoming SMS, view outgoing SMS, view all SMS, view all calls, view outgoing calls, view incoming calls, view Rejected calls, view Missed calls.

It is appreciated that the star need not include 8 function "positions" and may instead include any other number of function "positions" which a user can navigate toward easily with his finger, such as 4, 6 or 12 "positions".

Any suitable user inputs may be provided to augment the directional selection of functions, list items and horizontal menu items. For example, typically after a user is played an oral message describing a selected item, the system may expect the user to execute a selectable one of the following three:
    finalize choice of the item (e.g. by lifting the finger as when finalizing a chess move)
    cancel and exit choice e.g. by moving the finger from its present in-screen location, out of the screen area (without lifting finger)
    signal a desire to initiate access to up-down list or left-right menu as appropriate, e.g. by keeping her/his finger on the screen (with no further movement).

It is appreciated that the choices or selections presented to a user responsive to directional-moves e.g. as described herein may either be pre-defined in the system; or programmable by developers such as mobile application developers, for a touch screen which serves a mobile communication device such as a smart phone. It is appreciated that the choices or selections presented to a user may also be dynamically driven from a plurality of choices relevant to the specific capability. For example:
    In a Star representation of choices we typically presents a set of pre-arranged functions and the selected-choice or function represents an executable entity such as but not limited to a telephony application, an application that provides location data to the user or an application to download recorded books to the device.
    In a LIST, the directional-move typically presents a set of choices that are driven dynamically from a suitable database which may be updatable, such as a list of library books in computer storage, typically at a location remote to the smart phone or other device, that is updated periodically e.g. on a daily basis.
    In an ACTION, the capability/application developer may programmatically change the selected-choice for a directional-move based on the state of the application. For example, a move left when the user enters a book-reading application may point to a selected-choice of READ. The same directional-move to the left, while the book is being read, may point to a selected-choice of PAUSE.

Referring again to FIG. 4, it is appreciated that interpretation of a user's motions along the touch screen 30 e.g. by processor 50 in FIG. 4 may utilize standard capabilities enabled by the operating software of the device/panel. Conventional system software such as smartphone operating systems e.g. iOS and Android exists today which provides position of a finger's touch-point as a numeric value related to the touch position distance from the screen borders. The system also notifies of a finger move on the screen, including the new position of the finger and when the finger is lifted up.

Special gestures, as opposed to conventional finger moves, may be provided, typically throughout the interface, e.g. some or all of the following:
    Two swipes to the left—go back to the previous operating mode (also termed herein "screen-entity", "entity" or "computer environment entity")
    Two swipes to the right—go back to a main/home entity
    Two swipes up—play a verbal description of the current entity including options available within that entity.

Detection of the above special gestures, and differentiation from conventional finger moves may also be performed by processor 50 of FIG. 4 and may include detection of two finger swipes characterized by (a) occurring one after the other within x=threshold seconds, and (b) in similar directions, differing by less than a threshold angle between them. Some or all of the thresholds may be learned for individuals, while training individual users on the system.

FIGS. 7-10 illustrate an example step by step session during which a blind user easily utilizes an interface and operating system constructed and operative in accordance with an embodiment of the present invention, to listen to a stored audio book using a touch screen based device such as a smartphone. Starting up operations are illustrated in FIG. 7. Operations occurring within a first, home or "star" operating mode are illustrated in FIG. 8. Operations occurring within a second, "list" are illustrated in FIG. 9. Operations occurring within a third, "horizontal menu" are illustrated in FIG. 10. Some or all of the illustrated operations may occur, in any suitable order such as but not limited to the illustrated order.

In FIG. 7, typically, some or all of the following operations may occur, in any suitable order such as but not limited to the illustrated order:

Operation 710: User turns on the device by hitting the power-button.

Operation 720: During the startup process the device omits a continuous stream of short beeps and short vibrations to indicate that the device is starting up.

Operation 730: Once the system is ready for active engagement with the user, it plays a special starting tone to indicate to the user that it is ready. From this point on, the interaction between the user and the device typically follows a standard pattern e.g. as per some or all of the steps of some or all of FIGS. 8-10, typically sequentially.

As shown in FIG. 8, typically, some or all of the following operations may occur, in any suitable order such as but not limited to the illustrated order:

Operation 810: The default entity the system presents to users is a HOME or star-entity; optionally a representative screen e.g. illustrating selections arranged in a star, may be presented such that the term "screen" is sometimes used herein to indicate the operating mode represented by the screen. The HOME screen or operating mode is typically the only entity users can jump to from anywhere in the system e.g. using a predetermined special swipe.

Operation 820: User puts the finger anywhere on the touch-screen and the system reacts with a tone and/or vibration, at least one of which is typically unique for the HOME-entity so as to provide a clear indication to the user that s/he is in HOME.

Operation 830: User moves the finger at a 270 degree angle (to the left). This move, one out of, say, eight directional-moves corresponding to the up to 8 selection locations in the star, happens to be the pre-defined choice for the book-reading application. The system detects a finger move on the screen, identifies it as a directional move e.g. because the move is relatively long and relatively straight, and identifies the angle as being closest to 270 degrees as opposed to other possible angles around the star.

Operation 840: The system provides confirmation e.g. orally states "BOOKS" to indicate the user's selection to her or him.

Operation 850: The user lifts his finger up, detaching it from the touch-surface, to finalize the selection of the BOOKS function (also termed herein "capability" or "group of actions"); the operations of FIG. 9 are then initiated. Or, if the user decides not to activate the BOOK capability, he drags his finger out of the device surface to cancel the touch in which case the system remains in HOME entity and awaits further user action.

As shown in FIG. 9, typically, some or all of the following operations may occur, in any suitable order such as but not limited to the illustrated order:

Operation 910: The user is now within the BOOKS function, so placing his finger on the screen brings him to a LIST-entity presenting books available for listening.

Operation 920: Upon placing a finger on the screen the user is played an orientation signal e.g. tone and/or vibration that is or are unique to the LIST-entity.

Operation 930: The user may also hear the words 'My books' to provide an additional orientation message designating the current function or capability.

Operation 940: The user moves the finger up; and hears the name of the first book in the list. He keeps his finger on the screen with no further movement and listens to the books in the list one by one. The list may be circular such that having reached the end, the list starts from the beginning again. If the user moves his finger out of the screen, the entire touch may be cancelled (disregarded) and the user is typically restored to the state the system was in before the touch occurred.

Operation 950: When the user hears the book he is interested in, he lifts the finger and the operations of FIG. 10 are then initiated.

As shown in FIG. 10, typically, some or all of the following operations may occur, in any suitable order such as but not limited to the illustrated order:

Operation 1010: The current operating mode is now within the ACTION-entity (also termed horizontal-menu entity) of the selected book.

Operation 1020: The user puts the finger on the screen and gets an orientation signal e.g. tone and/or vibration that is unique to the ACTION-entity.

Operation 1030: The user typically also hears a verbal note with the name of the selected book.

Operation 1040: The user moves the finger to a selected horizontal direction e.g. to the right to go through the different action options including say, some or all of: READ, NEXT, Previous, Change speed, Chapters list. Upon hearing the READ option, the user lifts the finger up to choose the capability.

Operation 1050: The system starts playing the recorded book to the user.

Gesture recognition functionality, according to one embodiment of the present invention, is now described in detail with reference to FIGS. 11-13. The functionality may be provided in conjunction with any of the embodiments shown and described above.

Input Sources: Gesture data may be received from some or all of:

Accelerometer: e.g. Shake gestures
Inclinometer: e.g. Tilt actions and phone flip
Touch Screen: Finger movement
Proximity: When user puts the phone near his ear UI interaction may be disabled.
Sound recognition.

In star movements, which occur while the system is in its "star" operating mode, the user may move a finger in each of 8 directions. A change of direction triggers an event. Lifting a finger may generate another event which may select the action in the last direction. Finger lift may have a delay period before the event is generated, in order to allow for swipe actions to be performed and/or so as to override the action selection (Cancel, Back). The delay period may be configurable and a suitable default may be pre-defined. The key for finger lift delay is FINGER_LIFT_DELAY herein. The Up/Down and Left/Right directions as used in list may be a subgroup of the Star Movements.

Direction Change Detection: As shown in FIG. 11, directions may be PI/4 radians distanced from one another. A direction may be selected if the user's finger is within PI/12 radians from the direction line. As long as no new direction is selected, the last selected direction may remain the current one. A direction may be selected if the user's finger has moved DIRECTION_RADIUS from where the user has put it on the touch screen.

Cancel Swipe: A Cancel gesture may be generated as a result of a fast swipe left. A swipe may be defined as left movement of SWIPE_MINIMAL_DISTANCE DPI (Or out of screen) and a lift of the finger in less than SWIPE_TIME milliseconds. Cancel swipe may allow the user to lift a finger without performing any action.

Back Swipe: A Back swipe gesture may be defined as a double cancel swipe within SWIPE_TIME.

Flip Gesture: A Flip may be detected if the user has flipped the phone around one of the touch screen axes 180 degrees and back to the initial angle in FLIP_TIME. The tolerance for the border angles is defined as FLIP_ANGLE_TOLERANCE.

Home Gesture: A Home gesture, comprising any suitable unique gesture such as the gesture shown in FIG. 12 where the circle indicates initial finger position, may revert the software to the home screen. Android Gesture detection mechanism may be used for this purpose.

Screen click: A screen click may be detected when the user touches the screen and lifts his finger within SCREEN_CLICK_TIME without moving it to any direction.

? System capabilities and programming environment may be as shown in FIG. 13. Certain embodiments of the components of FIG. 13, some or all of which may be provided, are now described in detail:

A GestureLayout Object may be provided which is operative to catch finger movements of the user on the screen. There may be a plurality of, e.g. 3, types of finger movement:
  a. Finger touch: User puts a finger on the screen
  b. Finger lift: User lifts a finger from the screen
  c. Finger move: User moves a finger on the touch screen.
  Gesture detection may for example be as per Android GestureOverlayView.
Events detected by the GestureLayout object may include some or all of:
  a. Finger down: EVENT_FINGER_DOWN
  b. Finger up: EVENT_FINGER_UP
  c. Finger move e.g. some or all of:
    EVENT_DIRECTION_RIGHT
    EVENT_DIRECTION_BOTTOM_RIGHT
    EVENT_DIRECTION_BOTTOM
    EVENT_DIRECTION_BOTTOM_LEFT
    EVENT_DIRECTION_LEFT
    EVENT_DIRECTION_TOP
    EVENT_DIRECTION_TOP_RIGHT
  d. Gesture: such as but not limited to, GESTURE_HOME.

Typically, a ProximityService detects when user puts the phone close to his ear. When this happens, a UiAggregator, e.g. as described below, may ignore all input until device is removed from the user's ear.

Calls generated by ProximityService may include OnProximityChange (Boolean proximity)—called when there is a change in proximity. Proximity is set to True when proximity is detected, and false when device moves away.

ShakeService detects phone shakes. Calls generated may include onShakeDetected( ).

AngleDetectorService generates a call when angle of device is changed beyond a threshold. Call generated may include onAngleChange (float x, float y, float z).

The UiAggregator typically contains all the logic needed for implementing the UI. UiAggregator typically comprises an object that receives UI events and uses filtering and decision logic for routing the events to system activities. Typically, when a finger movement is received by the UI aggregator, it may be inserted into a queue. The finger movement may be processed only after SWIPE_TIME has elapsed. This is in order to allow swipes to be performed and filter out sporadic finger movements.

Finger Lift: typically, Finger lift triggers an action in RAY. However a finger lift might also occur due to a swipe action. Therefore finger lifts may be routed to activities only after FINGER_LIFT_DELAY. If a gesture is detected with the finger lift (Home gesture), then the gesture may take precedence and the gesture may be reported to registered activities. Cancel/Back swipes: A swipe is typically detected by some or all of the following criteria:
  a. The user's finger moved MINIMAL_SWIPE_DISTANCE on screen or out of phone
  b. The user lifter a finger in less than SWIPE_TIME.
  Doing a left swipe may cause the CANCEL event to be detected (Overriding the finger lift).
  After a CANCEL is detected the Aggregator may wait additionaBACK_SWIPE_DELAY to allow for a similar left swipe to occur. If a second left swipe is discovered, the action may be deemed a BACK action.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized system of facilitating eye-free use of an electronic device, including by blind users, the system comprising:
    a memory configured to store a software program coupled to a touch screen and comprising instructions;
    one or more processors coupled to the memory, the one or more processors configured to execute the instructions and perform operations to:
    provide a computerized user interface including a hierarchy of operating modes wherein each operating mode presenting a portion of a respective hierarchy of possible choices to a user, each portion comprising a sequence of possible users' choices within said hierarchy;
    and
    accept, via the touch screen, a sequence of selected options generated by the user responsive to the sequence of possible choices respectively, and each of the possible choices is associated with a function of the electronic device;
    wherein the hierarchy of possible choices includes at least some sequences of n possible choices which are presented within respective sequences of n operating modes which having n respective predetermined archetypical formats, each archetypical format is interpreted based on user's motions and representing a predetermined relative arrangement of input options, wherein the respective archetypical formats include at least one of a star format, a list format and a menu format;
    wherein for the list format, accept via the touch screen, at least one instruction for the computerized user interface to move up or down a list at a selectable one of two progress modes, by moving one finger or two fingers of the user, respectively, up or down relative to an initial location of the finger/s, the list comprises alphabetized items and wherein a first of the two progress modes moves from item to item whereas a second of the two progress modes moves from letter to letter thereby to yield more rapid motion within the list when an operating mode is represented by the list format within said hierarchy; and
    generate a plurality of orientation signals, sensible by the user, which are uniquely associated with the n archetypical formats respectively, wherein generation of each orientation signal coincides with presentation of its associated predetermined archetypical format, thereby to orient the user, even if blind, within said hierarchy.

2. The computerized system according to claim 1, wherein said formats include the star format in which choices are virtually arranged in a north-south-east-west star such that motion of the user's finger on the touch screen, relative to an initial location, is classified as being one individual direction from among up to 8 directions defined by the star and is interpreted, if not accompanied by a selection gesture, as a request to the computerized user interface to orally present a choice associated with the individual direction and if accompanied by a selection gesture, as a request to the software program to effect the choice associated with the individual direction.

3. The computerized system according to claim 1, wherein said formats include the list format in which choices are virtually arranged to form a vertical, up-down list such that motion of the user's finger on the touch screen, relative to an initial location is classified as being one individual direction from among (up, down), and is interpreted, if not accompanied by a selection gesture, as a request to the computerized user interface to orally present a choice associated with the individual direction, and, if accompanied by a selection gesture, as a request to the software program to effect the choice associated with the individual direction.

4. The computerized system according to claim 3, generate, by a directional vibration generator, a selectable one of an up-directed vibration and a down-directed vibration, to signify the user's motion up or down said list.

5. The computerized system according to claim 1, wherein said formats include the menu format in which choices are virtually arranged to form a horizontal, left-right menu such that motion of the user's finger on the touch screen, relative to an initial location is classified as being one individual direction from among (left, right}, and is interpreted, if not accompanied by a selection gesture, as a request to the computerized user interface to orally present a choice associated with the individual direction, and, if accompanied by a selection gesture, as a request to the software program to effect the choice associated with the individual direction.

6. The computerized system according to claim 5, generate, by a directional vibration generator, a selectable one of a right-directed vibration and a left-directed vibration, to signify the user's rightward or leftward motion within said menu.

7. The computerized system according to claim 1, wherein said sequences of operating modes having respective predetermined archetypical formats includes one of:
the star format in which choices are virtually arranged in a north-south-east-west star; and
the menu format in which choices are virtually arranged to form a horizontal, left-right menu,
followed by the list format in which choices are virtually arranged to form a vertical, up-down list.

8. The computerized system according to claim 7, wherein said sequence of archetypical formats includes one of the star and menu formats, followed by the list format, followed by another one of the star and menu formats.

9. The computerized system according to claim 8, wherein said sequence of archetypical formats includes the star format, followed by the list format, followed by the menu format.

10. The computerized system according to claim 1, wherein the hierarchy of possible choices to the user includes only one sequence of possible choices within said hierarchy.

11. The computerized system according to claim 1, wherein the plurality of orientation signals, sensible by the user, which are uniquely associated with the n archetypical formats respectively, each include a musical tone varying in at least one predetermined characteristic so as to uniquely represent each of the n archetypical formats.

12. The computerized system according to claim 11, wherein the predetermined characteristic comprises pitch.

13. The computerized system according to claim 1, wherein choices are made by motion of the user's finger, relative to an initial location, of at least a predetermined threshold magnitude, whereas motion of the user's finger, relative to the initial location, of less than the predetermined threshold magnitude, are not interpreted as choices.

14. The computerized system according to claim 1,
orally present choices in a predetermined sequence and
generate a vibration by a directional vibration generator, having at least two controllable directions, to signify that the choices are being presented forward or backward respectively.

15. A method of facilitating eye-free use of an electronic device, including by blind users, the method comprising:
providing a computerized user interface including a hierarchy of operating modes wherein each operating mode presenting a portion of a respective hierarchy of possible choices to a user, each portion comprising a sequence of possible users' choices within said hierarchy;
accepting, via a touch screen, a sequence of selected options generated by the user responsive to the sequence of possible choices respectively, each of the possible choices is associated with a function of the electronic device and activating functions of the electronic device accordingly,
wherein the hierarchy of possible choices includes at least some sequences of n possible choices which are presented within respective sequences of n operating modes which having n respective predetermined archetypical formats, each archetypical format is interpreted based on user's motions and representing a predetermined relative arrangement of input options, wherein the respective archetypical formats include at least one of a star format, a list format and a menu format;
wherein for the list format, accepting via the touch screen, at least one instruction for the computerized user interface to move up or down a list at a selectable one of two progress modes, by moving one finger or two fingers of the user, respectively, up or down relative to an initial location of the finger/s, the list comprises alphabetized items and wherein a first of the two progress modes moves from item to item whereas a second of the two progress modes moves from letter to letter thereby to yield more rapid motion within the list when an operating mode is represented by the list format within said hierarchy; and
generating, by the user interface, a plurality of orientation signals sensible by the user, which are uniquely associated with the n archetypical formats respectively, wherein generation of each orientation signal coincides with presentation of its associated predetermined archetypical format, thereby to orient the user, even if blind, within said hierarchy.

16. A computer program product, comprising a non-transitory tangible computer readable medium having computer readable program code embodied therein, said computer readable program code adapted to be executed to implement a method for facilitating eye-free use of an electronic device, including by blind users, the method comprising:
providing a computerized user interface including a hierarchy of operating modes wherein each operating mode presenting a portion of a respective hierarchy of possible choices to a user, each portion comprising a sequence of possible users' choices within said hierarchy;
accepting, via a touch screen, a sequence of selected options generated by the user responsive to the sequence of possible choices respectively, each of the possible choices is associated with a function of the electronic device and activating functions of the electronic device accordingly,
wherein the hierarchy of possible choices includes at least some sequences of n possible choices which are presented within respective sequences of n operating modes having n respective predetermined archetypical formats, each archetypical format is interpreted based on user's motions and representing a predetermined relative arrangement of input options, wherein the respective archetypical formats include at least one of a star format, a list format and a menu format;
wherein for the list format, accepting via the touch screen, at least one instruction for the computerized user interface to move up or down a list at a selectable one of two progress modes, by moving one finger or two fingers of the user, respectively, up or down relative to an initial location of the finger/s, the list comprises alphabetized items and wherein a first of the two progress modes moves from item to item whereas a second of the two progress modes moves from letter to letter thereby to yield more rapid motion within the list when an operating mode is represented by the list format within said hierarchy; and generating, by the user interface, a plurality of orientation signals, sensible by the user, which are uniquely associated with the n archetypical formats respectively, wherein generation of each orientation signal coincides with presentation of its associated predetermined archetypical format, thereby to orient the user, even if blind, within said hierarchy.

\* \* \* \* \*